J. W. JARBOE.

PAPER WAGON-BODY.

No. 6,771. Reissued Nov. 30, 1875.

Witnesses:

Chas. Raettig.
F. v. Briesen

Inventor:

J. W. Jarboe
by his attorney
A. v. Briesen

N. PETERS, PHOTO-LITHOGRAPHER, WASHINGTON, D. C.

UNITED STATES PATENT OFFICE.

JOHN W. JARBOE, OF GREEN POINT, NEW YORK.

IMPROVEMENT IN PAPER WAGON-BODIES.

Specification forming part of Letters Patent No. 92,611, dated July 13, 1869; reissue No. 6,771, dated November 30, 1875; application filed June 19, 1874.

DIVISION B.

*To all whom it may concern:*

Figure 1:
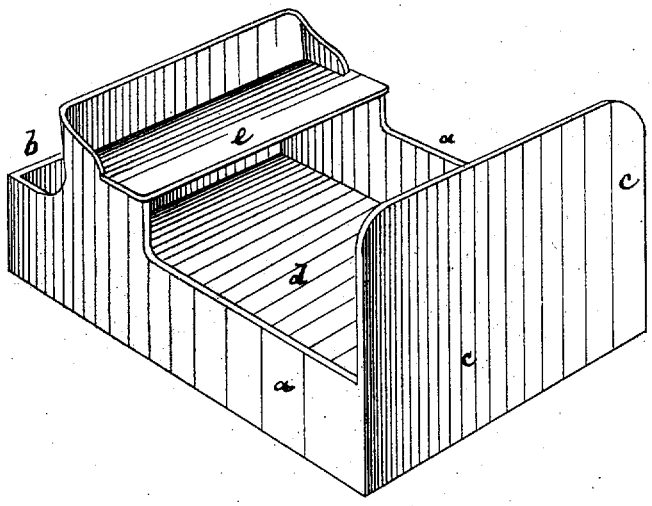
Figure 2:
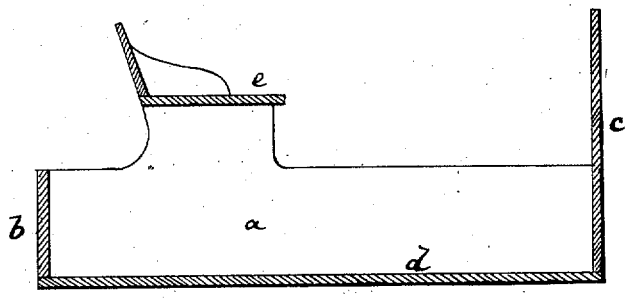

Be it known that I, JOHN W. JARBOE, of Green Point, Kings county, State of New York, have invented an Improved Composition Wagon-Body, of which the following is a specification:

Figure 1 is a perspective view of my improved wagon-body. Fig. 2 is a longitudinal vertical section of the same.

Similar letters of reference indicate corresponding parts in both figures.

This invention consists in a new construction of the bodies of wagons and other vehicles, by forming the sides, back, dash-board, seat, and bottom, or either of them, of paper, treated with a water-proof material, whereby not only lightness and strength together with durability under exposure to the weather, and facility for polishing and varnishing are secured, but whereby also said parts become not liable to warp, chip, or break, and the same may be manufactured cheaply, and put together with or without a supporting-frame.

Referring to the drawing, *a a* represent the sides, *b* the back, *c* the dash-board, *d* the bottom, *e* the seat, of the wagon-body, all of which parts, or either of them, being made of hard-pressed paper or paper-pulp treated with suitable water-proof material, and put together with dovetails, screws, or otherwise.

A good water-proof solution for treating the back, sides, and dash-board of paper, as described, may be made by mixing together the following ingredients in or about the proportion stated, to wit: five gallons linseed-oil; twenty-five pounds tar-pitch; five pounds rosin; one-half gallon spirits of turpentine; the whole mass to be mixed sufficiently to dissolve the rosin, thus forming a liquid solusion which may be applied to the paper parts by brushing, dipping, or otherwise. After the solution has been applied the paper ought to be dried at a temperature of from 140° to 150° Fahrenheit.

By this improvement all the advantages hereinbefore specified are secured—namely, cheapness, lightness, strength, and durability under exposure to the weather, with a large capacity for taking a high polish, and freedom from warping, breaking, or chipping.

I claim as my invention, and desire to have secured by Letters Patent—

A wagon or vehicle body made in part or in whole of paper treated with water-proof material, substantially as described.

J. W. JARBOE.

Witnesses:
A. V. BRIESEN,
J. V. BRIESEN.